April 12, 1966 C. F. MORAIN 3,245,856
COATING AND WRAPPING PIPE
Filed Feb. 6, 1963 2 Sheets-Sheet 1

INVENTOR
CLIFFORD F. MORAIN
BY Francis J. Klempay
ATTORNEY

April 12, 1966 C. F. MORAIN 3,245,856
COATING AND WRAPPING PIPE
Filed Feb. 6, 1963 2 Sheets-Sheet 2

INVENTOR.
CLIFFORD F. MORAIN
BY
*Francis J. Klempay*
ATTORNEY

United States Patent Office 3,245,856
Patented Apr. 12, 1966

3,245,856
COATING AND WRAPPING PIPE
Clifford F. Morain, Burgett Road, Youngstown, Ohio
Filed Feb. 6, 1963, Ser. No. 256,708
1 Claim. (Cl. 156—187)

This invention relates to the art of protecting pipe such as used in utility lines, for example, in the distribution of gas to dwellings and other buildings. Since these utility lines are more or less permanent installations it is highly desirable and a common practice is to first prepare the pipe before installation with an adhering layer or layers of corrosive resistant coatings and wrappings. For such protection to be effective there must not develop any breakthrough of the coating in any microscopic point on the surface of the pipe since the same will allow the penetration of moisture into direct contact with the metal of the pipe and the resulting corrosion and electrolysis will rapidly expand the pinpoint first attacked. As the oxidation builds up the resulting expansion lifts the adjacent coating and causes cracks therein which admit more moisture to accelerate the deterioration of the metal pipe as will be understood.

The embrittlement of the coating with age and the working of vibration forces and the expansion and contraction of the pipeline itself tends to loosen the coating from the line pipe, and the tendency is more pronounced if the coating is extremely thin. In such case fissures develop rather rapidly. Consequently it is very important that the thickness of the coating under the wrapping be extremely uniform, without being thinned out in any place. The wrapping must be applied under tension, and a common cause of thinning out of the coat on the pipe is the extra compressive force which develops under the overlap of the wrapping. The coating material is, of course, put on hot and it must be highly fluid for even distribution and to develop sufficient surface tension to avoid the formation of any microscopic openings through the thickness of the coating. Consequently the thin hot material is readily squeezed out from underneath the overlap of the wrapping, being transferred primarily to the spiral void which develops between the forward edge of the prior convolution and the new convolution being applied in the spiral wrapping of the pipe. It is the primary object of the present invention to avoid this concentration of increased pressure by the wrapping being applied on the coating applied ahead of the wrapping so that the coating is not thinned out at any place on the surface of the pipe.

A further object of the invention is the provision of an improved product of a protectively coated and wrapped length of pipe in which the coating applied to the pipe under the wrap is of more uniform thickness over the entire surface of the pipe.

Another object of the invention is the provision of an improved pipe coating and wrapping technique and of apparatus capable of carrying out the same.

The above and other objects and advantages of the invention will become apparent upon consideration of the following specification and the accompanying drawing wherein there is disclosed preferred embodiments of the invention.

In the drawing:
FIGURE 1 is a longitudinal section of a coated and wrapped pipe length produced in accordance with the principles of my invention;

Figure 1:
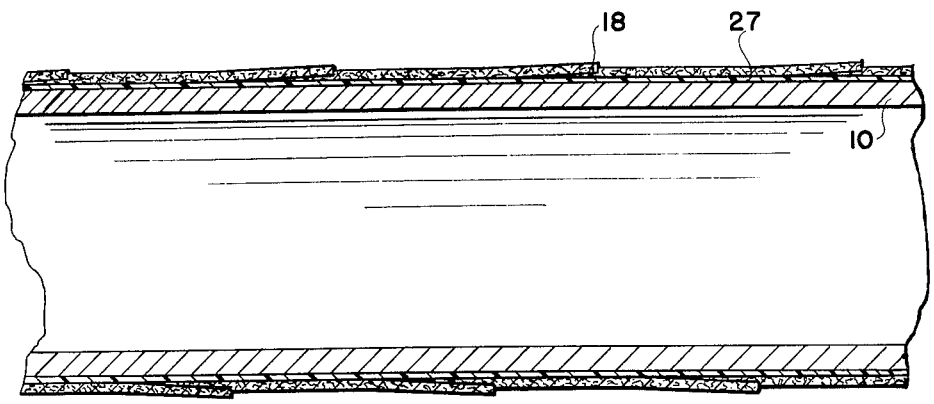
Figure 2:
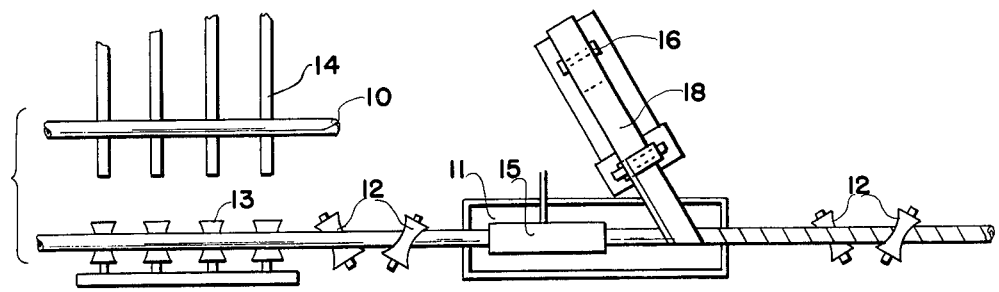
FIGURE 2 is a schematic plan view of apparatus for producing the product of FIGURE 1.

Referring first to FIGURE 1, reference numeral 10 designates a length of metal pipe which at the start of the coating and wrapping process is commonly gritblasted and uniformly coated with a very thin coat of primer as will be understood by those schooled in the art. The cleaned and primed pipe is then brought or moved to the coating and wrapping line as schematically shown in FIGURE 2. In the latter figure reference numeral 11 indicates a vat over which the pipe is passed longitudinally with a spiralling motion imparted by any suitable means such as the skewed hourglass rolls 12. The pipe lengths are furnished in succession by a driven conveyor 13 which receives the lengths from a pipe skid 14 and, in accordance with known practice in the art, the pipe lengths may be longitudinally interconnected by temporary coupling plugs, not shown, to provide a continuous uninterrupted length passing through the coating and wrapping equipment. The latter comprises a distributor or spray head 15 positioned above the vat 11 and also above the path of movement of the pipe length through the apparatus. To one side of the vat 11 is a reel 16 for receiving a coil of wrapping paper 17, and this reel is so angularly disposed with respect to the longitudinal axis of the pipe that the wrapping material when payed off the coil 17 in a generally flat condition wraps around the rotating and longitudinally moving pipe in a spiral manner, as indicated. As shown in FIGURE 2 the wrapping is supplied immediately beyond the distributor 15 while the coating material is still hot and quite fluid. The supporting reel 16 is commonly provided with an adjustable brake to control the back tension effected in the wrapping material as the latter is applied to the spirally advancing pipe. In accordance with usual practice this coating material is preheated in a suitable vat, not shown, and pumped under pressure to the distributor 15.

A wide variety of protective coating materials have been heretofore proposed for underground pipeline service including various resinous or plastic materials, waxes and coal tar products. Some of these materials, particularly the waxes, while having ample coating and spreading characteristics have low viscosity when heated and are therefore easily displaced by applied pressure. The compressive pressure applied by the wrapping to the coating on the pipe as it is being applied is insufficient to displace the coating if the pressure is uniform throughout the width of the wrapping. I have found, however, that throughout the zones of overlap of the wrapping the combined compressive forces exerted by the two thicknesses of wrapping cause excess shifting or flowing of the coating material under the overlap and excessive thinning of the coating in this area. For obvious reasons it is desirable to retain the overlap and to overcome its objectionable effect this invention proposes that a side edge portion of the wrapping material be offset, and if the material permits, be rolled down to reduce the thickness of the offset portion and, in some instances, to impart a feathered edge to the wrapping. The wrapping, thus prepared, may be put on the pipe in such manner that the offset surface of the side edge portion of the wrapping is on the outside and is at the free edge of the convolution being applied, all as evident from FIGURES 1 and 2 of the drawing. The inner edge portion of the next convolution which is of uniform thickness with the body of the wrapping then fits into the rabbet or offset of the first convolution and the result is that the overlap is of less over-all thickness and the void about the edge of the convolutions is much reduced to thereby not only lessen the compressive force exerted by the overlap but also to impede a longitudinal displacement of the coating material under the overlap. The finer the feather edge the better.

The wrapping material or web is designated herein by reference numeral 18 and is commonly a heavy felt or kraft paper furnished the user in coil form 17. The cross-sectional shape of the strip as taught herein may be either imparted into the product during its manufacture or prior to its reeling into the coil 17 but for reasons of versatility I prefer to cross-sectionally shape the web immediately before it is wound onto the pipe to be protected. The web materials are somewhat spongy and after elapse of time and alternate dry and moist cycles tend to restore themselves back to the initial uniform flatness of the strip. I accordingly interpose between the uncoiling reel 16 and the path of travel of the pipe through the wrapping machine a roll stand having one roll 19 journalled to rotate about a fixed axis and having an outer working surface which is reduced in diameter for a distance extending inwardly from one end of the roll as shown at 20. Roll 19 is journalled in a stand 20′ which has provisions, not shown in detail, to rotatably support a second roll 21 and to permit this latter roll to have floating movement toward and away from the roll 19. The general mechanical arrangement is conventional in pinch roll design, the roll 21 being urged toward the roll 19 by springs 23 the compression and force of which are regulated by a pair of screws 24, one for each end of the roll.

Figure 4:
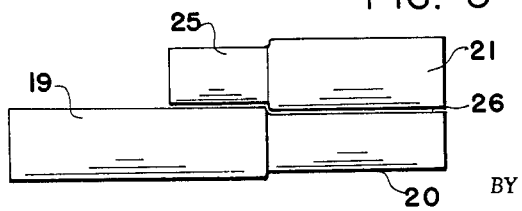

As shown in FIGURE 4 one end portion of the roll 21 is of reduced diameter as shown at 25 so that the rolls 19 and 21 nest with each other and provide a side edge pass portion 26 which is offset with respect to the general plane of the wrapping material passing through the rolls, it being assumed that the width of this strip material is approximately equal or slightly less than the length of the roll 19. In actual practice the rolls 19 and 21 are so ground that the transition between the general pass plane and the offset pass plane is eased or rounded so as to avoid slitting of the wrapping and if the wrapping material will permit of being calendered or reduced in thickness the rolls are preferably so ground that the pass plane 26 will impart a taper to the wrapping edge portion running through this pass, the web thinning toward its edge.

The coating material applied by the distributor 15 to the outer surface of the cleaned and primed pipe is shown at 27 in FIGURE 1, and it should be noted that as the wrapping is applied onto the outer surface of this coating that the inner surface of the wrapping overlies the outer surface of the coating in a substantially continuous uninterrupted and uniform manner. Consequently there is little or no localization of increased pressure and the inherent compressive strength of the coating material is sufficient to float the wrapping even when applied under considerable tension, as required, in uniform spacing from the primed surface of the pipe to thereby effect a coating of uniform thickness. Further, by substantially reducing the volume of the spiral void which heretofore was formed along the spiralling edge of the applied wrapping there is little or no space to be occupied by coating material which may be squeezed out by the tension and compression applied to and through the wrapping thereby further decreasing any tendency for localized thinning of the coating.

While I have, for illustration purposes, selected a process wherein a single thickness of coating and wrapping is applied to primed pipe it should be understood that this is by no means limitive of the application of the invention. In many processes a layer of heavy felt is applied onto a first deposited coating after which a second coating of different characteristic than the first is applied onto the felt and then wrapped with heavy kraft paper, and it should be apparent that my invention is equally applicable to such better protected products. In normal use of the products the wrappings are commonly punctured, and indeed the outer wrapping soon deteriorates, so that the most important indicia of a quality protected product is uniformity in thickness of the adhered impervious and corrosion resistant coating. The products in my invention do not exhibit any band or bands of thinned-down coatings and in this respect are superior to protected pipe heretofore produced in the industry.

Figure 3:
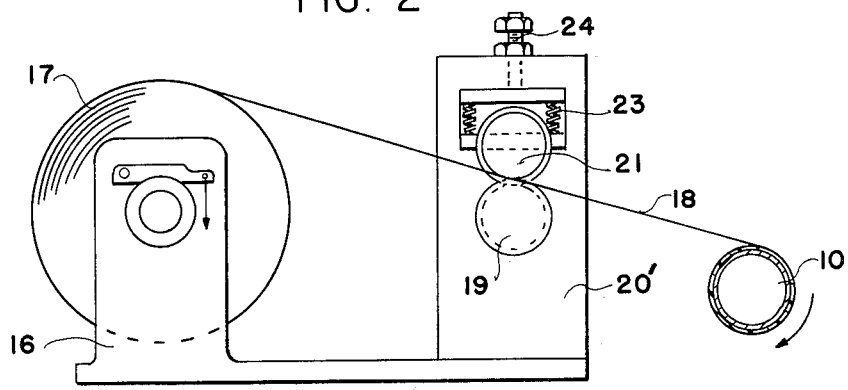
FIGURES 3 and 4 are schematic showings of a portion of the apparatus of FIGURE 2.

The above specifically described embodiment of the invention is principally adapted for use with wrapping materials which are crushable—i.e. capable of being reduced in thickness and of being tapered with moderate forming roll pressures. For many applications it may be desirable to employ the embodiment illustrated in FIGURE 5 wherein the pipe length 10′ coated with the adherent material 27 is wrapped with the strip material 18′ having an outwardly offset edge portion 18″. It should be understood that in this embodiment the free edge of the convolution of the wrapping is simply the thickness of the wrapping material and the offset edge portion is overwrapped on such free edge. Of course, this requires a reversal of the roll pass arrangement suggested in FIGURES 2 thru 4 since now the offset is not on the free edge of the convolution being applied but rather on the connected edge. Again, I prefer to taper the offset edge portion 18″ as shown in FIGURE 5 is the nature of the wrapping material permits.

Figure 5:
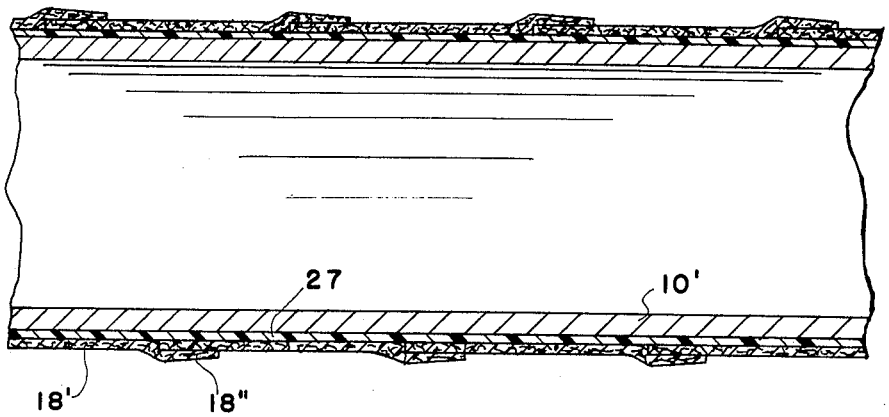
FIGURE 5 is a longitudinal section of a coated and wrapped pipe showing by an alternate embodiment of my invention.
Figure 6:
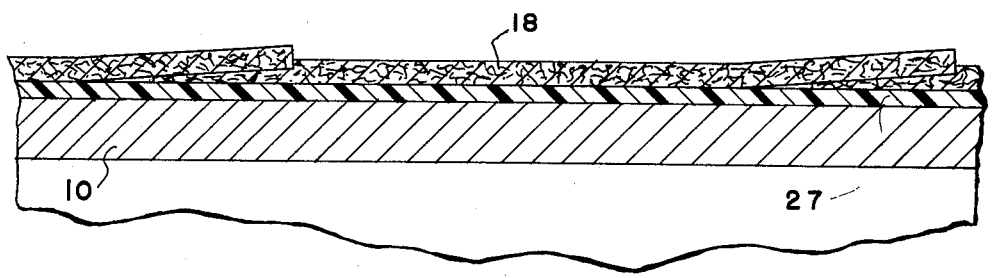
FIGURES 6 and 7 are fragmentary longitudinal sections of coated and wrapped pipe illustrating, on an enlarged scale, the embodiments of FIGURES 1 and 5, respectively.
Figure 7:
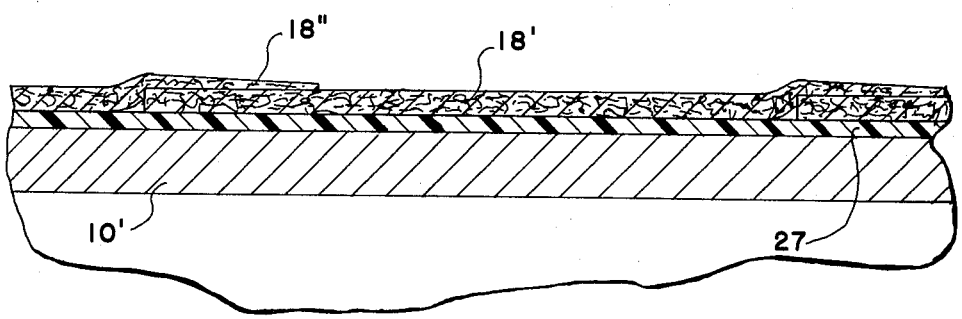

In the embodiment of the invention illustrated in FIGURE 5 the application of the successive convolution of the wrapping may be considered as having progressed from right to left. Thus, each convolution is deposited "flat" on the hot previously deposited coating material and the wrapping is floated uniformly on such material. There is no tendency for this fluent material to squeeze out (axially), and when the next succeeding convolution is applied the offset 18″ prevents the buildup of excessive pressure at the free edge of the prior convolution. Further, the inner rabbet of the new convolution effectively seals the hot fluent coating material against axial displacement so there is no thinning of this material on the pipe.

It should now be apparent that I have provided novel methods and apparatus which accomplish the objects initially set out above. By preventing the buildup of excessive compressive forces at the overlap of the wrapping in spirally wrapped pipe and materially restricting the volume of the spiral void which heretofore has been unavoidable in this process my invention enables the pipe to be adequately hot coated and tightly wrapped without any appreciable thinning of the coating material applied to the pipe.

Having thus described my invention what I claim is:

The method of protecting the exterior surface of a metal pipe length which comprises the steps of first coating said surface with a layer of heated corrosion-resistant and adhering material which upon cooling becomes highly impervious to air and moisture, and immediately thereafter and while said material remains hot and tacky applying under tension a covering web over said coating material in a spirally wound and overlapped relation, and said web being formed longitudinally along one of its side edge portions which is to be coincident with the overlap with an offset into which the complementary portion of the overlap is laid whereby the compressive force exerted by the web on the said coating material is substantially uniform throughout the longitudinal length of the pipe to thereby prevent displacement of the heated coating material longitudinally along the pipe.

References Cited by the Examiner

UNITED STATES PATENTS

| | | | |
|---|---|---|---|
| 1,287,945 | 12/1918 | Ford | 138—150 |
| 1,871,125 | 8/1932 | McGary et al. | 138—150 X |
| 2,225,026 | 12/1940 | Welsh | 138—150 X |
| 2,340,326 | 2/1944 | Horrigan | 156—392 |
| 2,382,834 | 8/1945 | Tynan | 138—144 |
| 2,402,040 | 6/1946 | Goldman | 138—144 |
| 2,583,819 | 1/1952 | Cummings | 156—392 |
| 2,713,383 | 7/1955 | Kennedy | 138—150 X |
| 2,748,805 | 6/1956 | Winstead | 138—144 |
| 2,895,511 | 7/1959 | Seltman | 138—150 X |

LAVERNE D. GEIGER, *Primary Examiner.*

LEWIS J. LENNY, EDWARD V. BENHAM,
*Examiners.*